US008335852B2

(12) United States Patent
Hokimoto

(10) Patent No.: US 8,335,852 B2
(45) Date of Patent: Dec. 18, 2012

(54) CONTACT DESTINATION INFORMATION REGISTRATION METHOD, NETWORK SYSTEM, NODE, AND CONTACT DESTINATION INFORMATION REGISTRATION PROGRAM

(75) Inventor: Akihiro Hokimoto, Kanagawa (JP)

(73) Assignee: Sony Corporation (JP)

( * ) Notice: Subject to any disclaimer, the term of this patent is extended or adjusted under 35 U.S.C. 154(b) by 781 days.

(21) Appl. No.: 11/982,920

(22) Filed: Nov. 6, 2007

(65) Prior Publication Data

US 2008/0120702 A1 May 22, 2008

(30) Foreign Application Priority Data

Nov. 22, 2006 (JP) .............................. P2006-316360

(51) Int. Cl.
*G06F 15/16* (2006.01)
(52) U.S. Cl. ....................................................... 709/227
(58) Field of Classification Search ................... 709/227
See application file for complete search history.

(56) References Cited

U.S. PATENT DOCUMENTS

| 2006/0031534 | A1* | 2/2006 | Ishiyama et al. | 709/227 |
| 2006/0123136 | A1* | 6/2006 | Oku et al. | 709/250 |
| 2006/0191020 | A1* | 8/2006 | Miller | 726/28 |
| 2007/0211705 | A1* | 9/2007 | Sunstrum | 370/356 |
| 2008/0066156 | A1* | 3/2008 | Ikeda et al. | 726/3 |
| 2008/0070543 | A1* | 3/2008 | Matuszewski et al. | 455/404.1 |
| 2009/0034494 | A1* | 2/2009 | Binet et al. | 370/338 |
| 2011/0047380 | A1* | 2/2011 | Miller | 713/168 |

FOREIGN PATENT DOCUMENTS

| JP | 2005-184450 | 7/2005 |
| JP | 2005-234762 | 9/2005 |
| JP | 2006-217538 A | 8/2006 |

OTHER PUBLICATIONS

Tomohiro Nishitani, P2P architecture, A getting started about a distributed hash table, UNIX magazine, Oct. 1, 2006, vol. 21, No. 6, p. 26-33.

Japanese Office Action issued on Oct. 27, 2008, in connection with corresponding Japanese Appln. No. 2006-316360.

* cited by examiner

*Primary Examiner* — Brian P Whipple
*Assistant Examiner* — James Edwards
(74) *Attorney, Agent, or Firm* — Lerner, David, Littenberg, Krumholz & Mentlik, LLP

(57) ABSTRACT

Disclosed herein is a contact destination information registration method employed in a network system including nodes and employing a distributed hash table. When registering contact destination information corresponding to a predetermined node address in the table, the node first performs a first operation of looking up a value associated with a key corresponding to the node address in the table, and, if no such value is found, registering provisional contact destination information in the table so as to be associated with the key and acquiring a registration time of the provisional information, but, if any such value is found, acquiring a registration time of that value, and then performs a second operation of registering the true contact destination information in the table, if the registration time of the value associated with the key in the table coincides with the registration time acquired by the first operation.

4 Claims, 11 Drawing Sheets

CONTACT DESTINATION INFORMATION REGISTRATION METHOD, NETWORK SYSTEM, NODE, AND CONTACT DESTINATION INFORMATION REGISTRATION PROGRAM

CROSS REFERENCES TO RELATED APPLICATIONS

The present application claims priority from Japanese Patent Application No. JP 2006-316360, filed in the Japanese Patent Office on Nov. 22, 2006, the entire content of which is incorporated herein by reference.

BACKGROUND OF THE INVENTION

1. Field of the Invention

The present invention relates to a contact destination information registration method, a network system, a node, and a contact destination information registration program. In particular, the present invention relates to a contact destination information registration method and so on in which when a node registers contact destination information corresponding to a predetermined node address in a distributed hash table, the node performs a first request operation of acquiring a registration time of a value registered in the distributed hash table so as to be associated with a key that is a hash value of the predetermined node address, and thereafter performs a second request operation of, if a registration time of a value registered in the distributed hash table so as to be associated with that key coincides with the registration time acquired in the first request operation, registering the contact destination information in the distributed hash table so as to be associated with that key, in order to enable registration of a plurality of pieces of contact destination information for a single node address.

2. Description of the Related Art

As a communication control protocol, Session Initiation Protocol (SIP) described in Japanese Patent Laid-Open No. 2005-184450 and so on is known, for example. SIP is an application-layer signaling protocol for initiating, modifying, and terminating a multimedia session on an initiation protocol (IP) network. SIP is standardized in RFC3261.

An IP telephone and a communication terminal for a video conference system or the like that employ SIP demand introduction of an SIP proxy server, a registrar server, and so on (which will be hereinafter referred to as an "SIP server") to perform name resolution for an SIP Uniform Resource Identifier (URI).

FIG. 10 illustrates a basic configuration 200 of a communication system that employs SIP. In this basic configuration 200, a terminal (calling party) 201, a terminal (called party) 202, and an SIP server 203 are connected to one another via an IP network 204.

FIG. 11 illustrates an example of signaling that employs SIP. (1) In order to establish a session, the terminal (calling party) 201 sends an INVITE message to a proxy server 203a with the terminal (called party) 202 as a destination. (2) The proxy server 203a sends an SIP URI included in the INVITE message to a location server 205 to inquire of the location server 205 an IP address of the destination terminal (called party) 202.

(3) The location server 205 looks up the IP address associated with the SIP URI sent from the proxy server 203a, and sends the IP address of the terminal (called party) 202 to the proxy server 203a. (4) The proxy server 203a uses the IP address of the terminal (called party) 202 sent from the location server 205 to forward the INVITE message sent from the terminal (calling party) 201 to the terminal (called party) 202.

(5) The terminal (called party) 202 receives the INVITE message from the terminal (calling party) 201, and performs a ringing process such as ringing a telephone bell. (6) Then, upon off-hook of a telephone receiver or the like, the terminal (called party) 202 sends a success response (200 OK) to the proxy server 203a, and (7) the proxy server 203a forwards the success response to the terminal (calling party) 201.

(8) The terminal (calling party) 201 receives the success response from the terminal (called party) 202, and sends an ACK response (acceptance of session establishment) to the proxy server 203a. (9) The proxy server 203a forwards the ACK response to the terminal (called party) 202. As a result, a session is created between the terminal (calling party) 201 and the terminal (called party) 202, and audio data is exchanged therebetween on the created session, i.e., communication is established.

In a small- or medium-scale communication system with a small or moderate number of participating terminals, there is a desire for a communication environment to be realized more easily without the need for the introduction of the SIP server. One conceivable method to realize the above is to apply an overlay network. The overlay network is a technique of forming a virtual network on top of a network layer, such as the IP network, on the assumption that connection on the network layer is ensured. There are various methods for realizing the overlay network, one of which is a method of using a technology of a distributed hash table such as Chord.

As described in Japanese Patent Laid-Open No. 2005-234762, for example, the distributed hash table is a technology of allowing a collection of storage units in a plurality of nodes (i.e., terminals) to function as a single enormous hash table. In the overlay network that employs the distributed hash table, a collection of nodes that form this enormous hash table form the overlay network. Data to be stored in the hash table is stored in a node (a hash table) on the overlay network based on a key (a hash value) calculated from the data itself, a name assigned to the data, or the like using a hash function. It depends on an adopted algorithm which node actually stores the data. When there is a desire to access a value, the value is acquired, based on the key, from the node that stores the value.

In Chord[2], for example, a single ring is first formed by the nodes that participate in the overlay network, and data held by each of the nodes is stored in a node in the single ring based on a key calculated using a hash function such as SHA-1. Access to the nodes or resources is achieved efficiently by taking proper advantage of how the nodes are ordered in the ring.

In the overlay network employing the distributed hash table, information or data of the nodes participating in the overlay network is generally distributed among and stored in the storage units of the nodes. Therefore, the storage units of the nodes can be considered as being shared by all the nodes participating in the overlay network as they can be accessed by each of the nodes. Proper use of this distributed shared storage enables the name resolution for the SIP URL as performed by the SIP server, for example, to be achieved without the use of the SIP server.

FIG. 12 illustrates an example of signaling that employs the distributed hash table. (1) A terminal (calling party) 301 looks up, in a distributed hash table (i.e., the overlay network) 303, a value (i.e., an IP address of a terminal (called party) 302) associated with a key that is a hash value for the terminal (called party) 302, and (2) the terminal (calling party) 301 acquires the value associated with the key from the distributed hash table 303.

(3) The terminal (calling party) 301 sends an INVITE message to the terminal (called party) 302 using the value (i.e., the IP address of the terminal (called party) 302) associated with the key, which has been acquired from the distributed hash table 303. (4) The terminal (called party) 302 receives the INVITE message from the terminal (calling party) 301, and performs a ringing process such as ringing a telephone bell. (5) Then, upon off-hook of a telephone receiver or the like, the terminal (called party) 302 sends a success response (200 OK) to the terminal (calling party) 301.

(6) The terminal (calling party) 301 receives the success response from the terminal (called party) 302, and sends an ACK response (acceptance of session establishment) to the terminal (called party) 302. As a result, a session is created between the terminal (calling party) 301 and the terminal (called party) 302, and audio data is exchanged therebetween on the created session, i.e., communication is established.

SUMMARY OF THE INVENTION

In order to achieve a basic function normally performed by the SIP server not by using the server but by using the distributed hash table, it may be necessary to resolve the following issue, which does not arise when employing the server: when a single SIP URI has a plurality of contact destinations, for example, how the plurality of contact destinations should be registered in the distributed hash table. Since the distributed hash table is a resource shared by the plurality of nodes, exclusive access control is demanded.

The present invention has been devised to enable registration of a plurality of pieces of contact destination information for a single node address.

A concept of the present invention lies in a contact destination information registration method employed in a network system that includes a plurality of nodes and employs a distributed hash table. When registering contact destination information corresponding to a predetermined node address in the distributed hash table, the node first performs a first request operation of looking up a value associated with a key that is a hash value of the predetermined node address in the distributed hash table, and, if no value associated with the key is registered in the distributed hash table, registering provisional contact destination information in the distributed hash table so as to be associated with the key and acquiring a registration time of the provisional contact destination information. But, if any value associated with the key is registered in the distributed hash table, acquiring a registration time of the value registered. And then performs a second request operation of registering the true contact destination information in the distributed hash table so as to be associated with the key, if the registration time of the value registered in the distributed hash table so as to be associated with the key coincides with the registration time acquired by the first request operation.

According to the present invention, the node performs the first and second request operations in this order to register the contact destination information (e.g., an IP address) for the predetermined node address in the distributed hash table. Specifically, when registering the contact destination information corresponding to the predetermined node address in the distributed hash table, the node first performs the first request operation to acquire the registration time of the value that is registered in the distributed hash table so as to be associated with the key that is the hash value of the predetermined node address. At this time, if, as a result of searching the distributed hash table, it is found that no value associated with the key is registered in the distributed hash table, the node registers the provisional contact destination information in the distributed hash table so as to be associated with the key, and acquires the registration time of the provisional contact destination information.

Thereafter, the node performs the second request operation to register the true contact destination information in the distributed hash table so as to be associated with the key, if the registration time of the value registered in the distributed hash table so as to be associated with the key coincides with the registration time acquired by the first request operation. This makes it possible to register a plurality of pieces of contact destination information for a single node address.

DETAILED DESCRIPTION OF THE PREFERRED EMBODIMENTS

Figure 1:
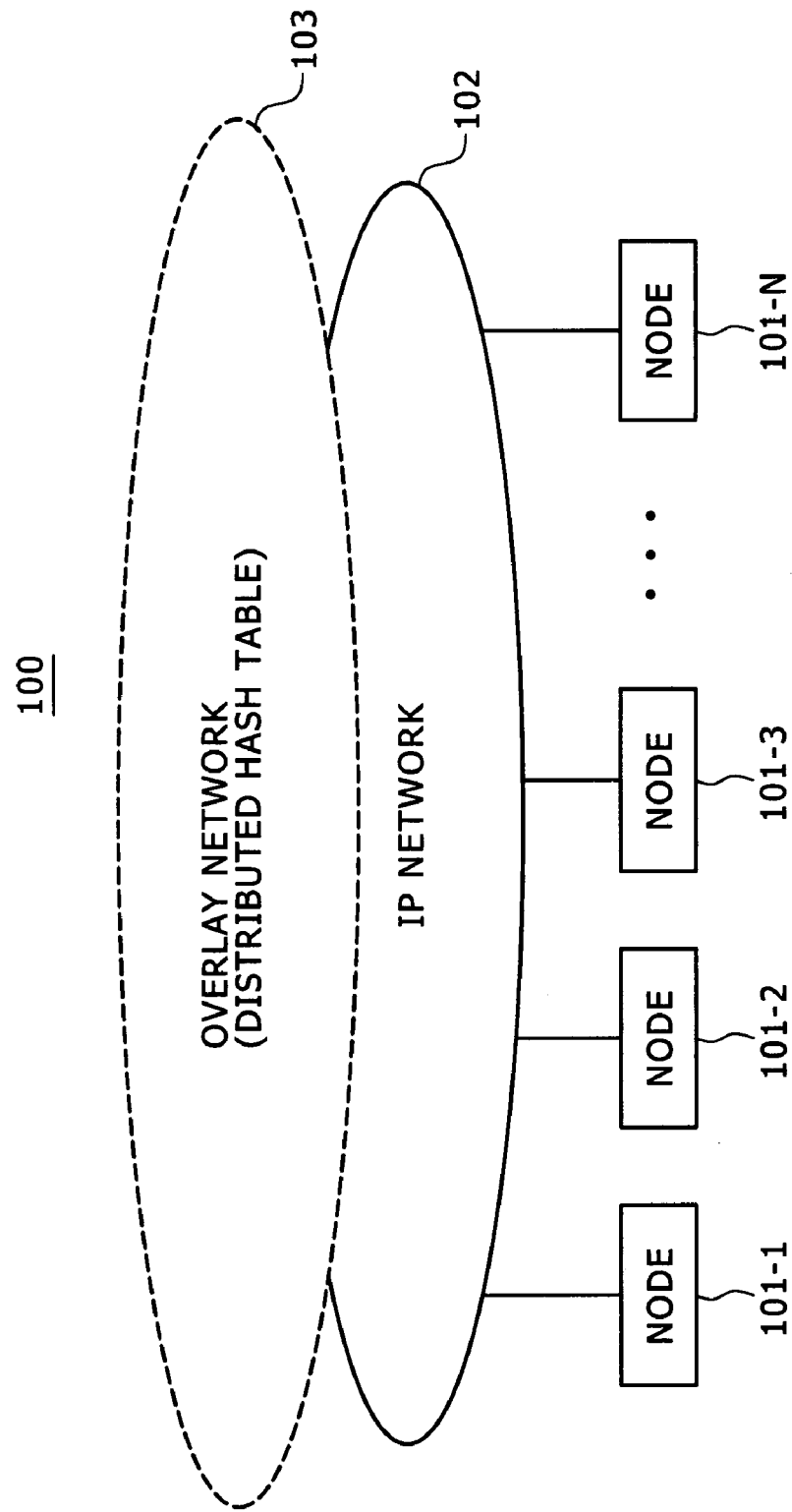
FIG. 1 is a diagram illustrating a configuration of a network system that employs a distributed hash table according to one embodiment of the present invention.

FIG. 1 illustrates a network system 100, formed by a plurality of nodes, that employs a distributed hash table according to one embodiment of the present invention. In this network system 100, N nodes (terminals) 101-1 to 101-N are connected to an IP network 102. In this case, the nodes 101-1 to 101-N collectively form a distributed hash table (overlay network) 103.

[Outline of Distributed Hash Table]

There are various algorithms of the distributed hash table, such as Chord and Kademlia. Here, in order to describe a basic algorithm-independent function of the distributed hash table, the following abstract concepts are used.

Name: A name assigned to identify data.
hash(x): A hash function for calculating a key.
key: A hash value calculated using the hash function.

PUT(key,value): Add value corresponding to key into the distributed hash table.

DELETE(key): Delete a value associated with key from the distributed hash table. At this time, the deleted value is acquired.

LOOKUP(key): Look up a value associated with key in the distributed hash table.

For example, PUT(hash(name),value) is used when registering a value value of a name name in the distributed hash table. This results in value being stored in a storage unit of a node corresponding to a key calculated by hash(name).

Similarly, DELETE(hash(name)) is used when deleting the value associated with the name name from the distributed hash table.

[Update of Data Stored in Distributed Hash Table and SIP Signaling]

Figure 2:
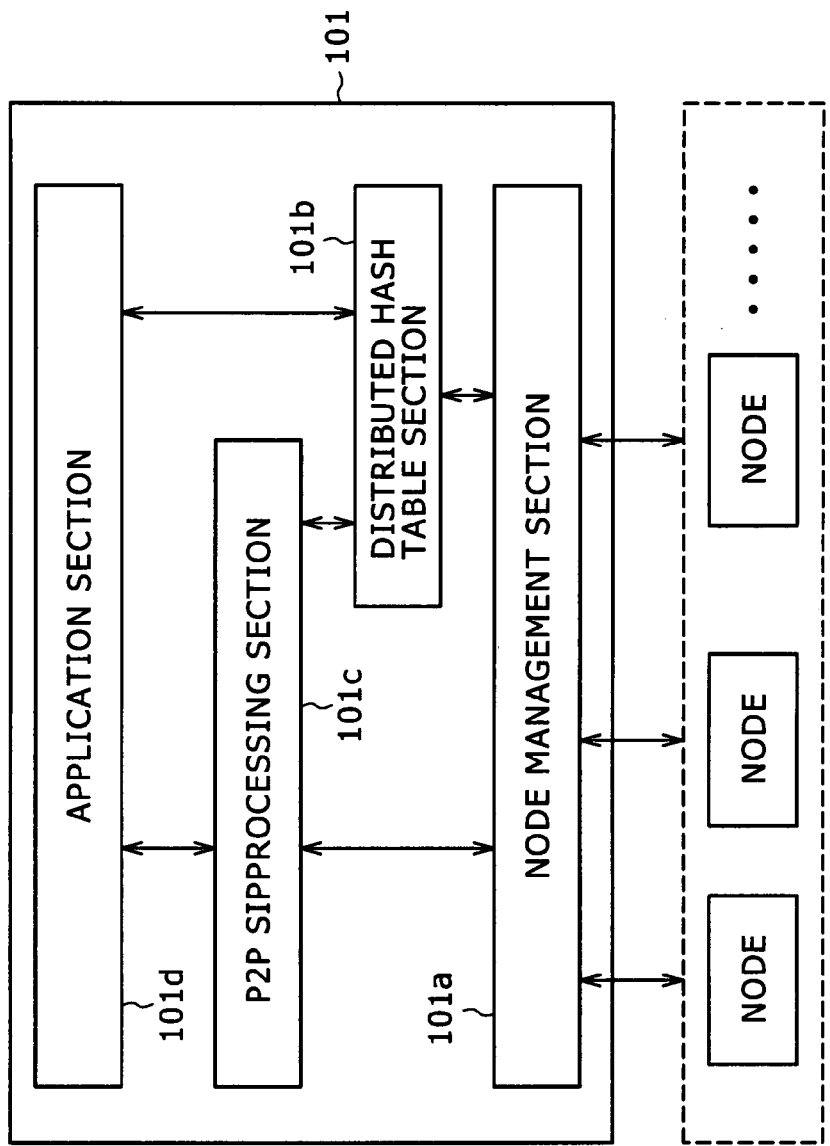
FIG. 2 is a block diagram illustrating a structure of a node that forms a part of the network system that employs the distributed hash table.

FIG. 2 illustrates a structure of a node 101, which is any of the nodes 101-1 to 101-N that form the network system 100 illustrated in FIG. 1. The node 101 includes a node management section 101a, a distributed hash table section 101b, a P2PSIP processing section 101c, and an application section 101d.

The node management section 101a is a unit for managing each of the nodes that participate in the overlay network, i.e., form the distributed hash table. The distributed hash table section 101b is a unit for performing a process of adding, deleting, or retrieving data to or from the distributed hash table. The P2PSIP processing section 101c is a unit for mapping a process equivalent to a process of registering data in accordance with a REGISTER request or a PUBLISH request in SIP onto the distributed hash table.

In order to accomplish, using the distributed hash table, the process equivalent to the process performed when using the SIP server, it is necessary to store, in the distributed hash table, information equivalent to contact information to be stored in the SIP server at the time of the REGISTER request.

An XML document below is an example of contact information of a node address, sip:alice@sony.net, written in XML. In this example, IPv4 is used for an IP address, but IPv6 is also applicable in a similar manner. In this XML document, a contact destination of sip:alice@sony.net is sip:alice@192.168.0.1:5060 described in <contact> tags.

```
<?xml version="1.0" encoding="utf-8"?>
<contactinfo          entry="sip:alice@sony.net"
xmlns="http://xmlns.sony.net/dht/sip">
    <entry>
    <contact>sip:alice@192.168.0.1:5060</contact>
    <updated>2006-08-16T20:48:32+09:00</updated>
    <expires>3600</expires>
    <methods>
    <allow>INVITE</allow>
    <allow>CANCEL</allow>
    <allow>BYE</allow>
    <allow>ACK</allow>
    <allow>OPTIONS</allow>
    <allow>PRACK</allow>
    <allow>UPDATE</allow>
    </methods>
    <extensions>
    <supported>100rel</supported>
    </extensions>
    </entry>
</contactinfo>
```

When registering the contact information in the distributed hash table, the following two cases need be considered.

(a) For a single SIP URI, a single piece of contact destination information is added at one time to the distributed hash table.

(b) For a single SIP URI, a plurality of pieces of contact destination information are simultaneously added to the distributed hash table.

Figure 3:
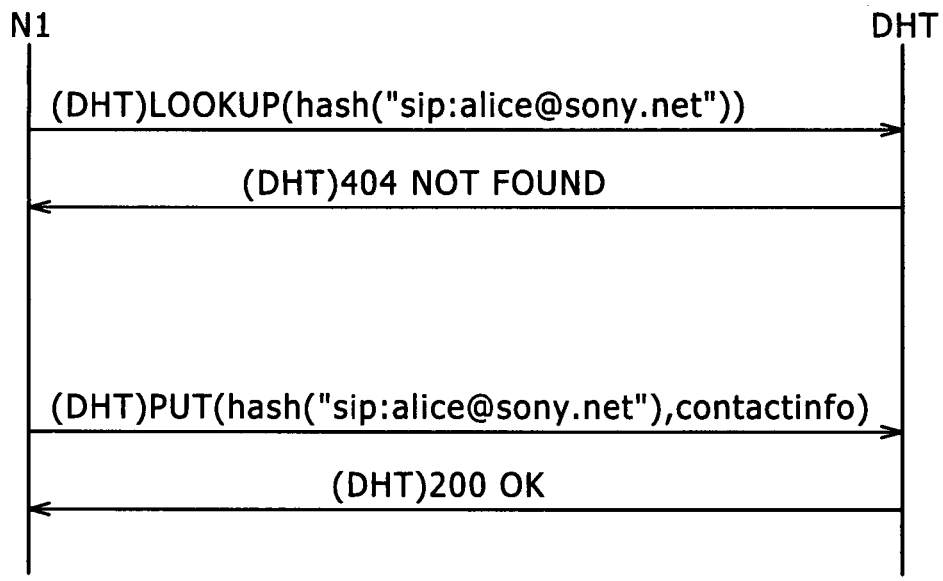
FIGS. 3 and 4 illustrate sequences of registration of contact destination information in a communication environment in which only one piece of contact destination information can be registered at a time.
Figure 4:
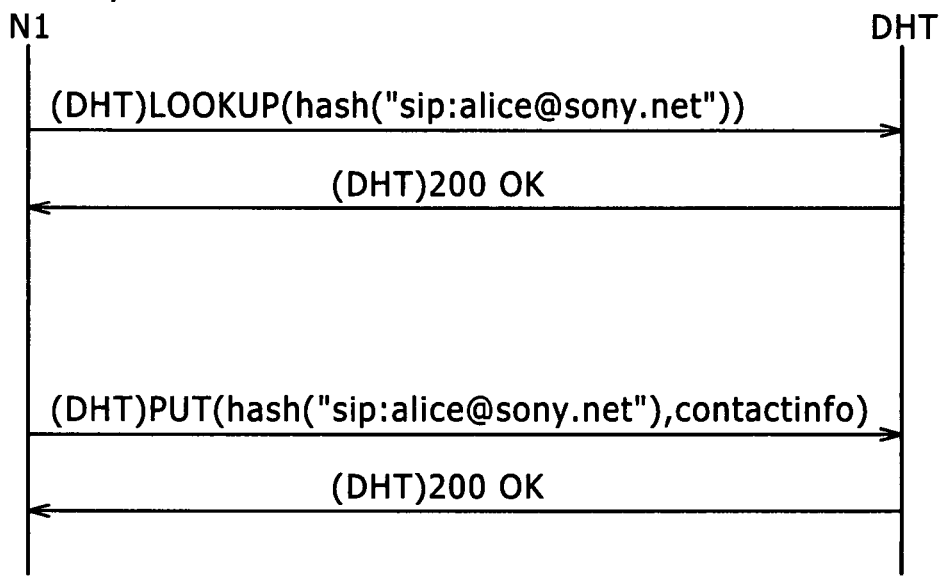

Case (a) above can be handled relatively easily. FIGS. 3 and 4 are sequence diagrams illustrating registration of the contact destination information in a communication environment in which only one piece of contact destination information can be registered at a time.

FIG. 3 is a sequence diagram illustrating a case where the contact destination information for sip:alice@sony.net is registered for the first time. A registration sequence is as follows.

(1) Upon login of sip:alice@sony.net, node N1 transmits a LOOKUP request to a distributed hash table DHT.

(2) The distributed hash table DHT looks up a value associated with a key hash("sip:alice@sony.net"). Since no such value is found, the distributed hash table DHT transmits a 404 NOT FOUND response to node N1.

(3) In order to register the contact destination information for sip:alice@sony.net, contactinfo, in the distributed hash table DHT, node N1 transmits a PUT request to the distributed hash table DHT.

(4) Upon completion of the registration, the distributed hash table DHT transmits a 200 OK response to node N1.

FIG. 4 is a sequence diagram illustrating a case where the contact destination information already registered is updated. An update sequence is as follows.

(1) Upon login of sip:alice@sony.net, node N1 transmits the LOOKUP request to the distributed hash table DHT.

(2) The distributed hash table DHT looks up the value associated with the key hash("sip:alice@sony.net"). Since the value is found, the distributed hash table DHT transmits the 200 OK response to node N1.

(3) In order to register the contact destination information for sip:alice@sony.net, contactinfo, in the distributed hash table DHT, node N1 transmits the PUT request to the distributed hash table DHT.

(4) Upon completion of the registration, the distributed hash table DHT transmits the 200 OK response to node N1.

Figure 5:
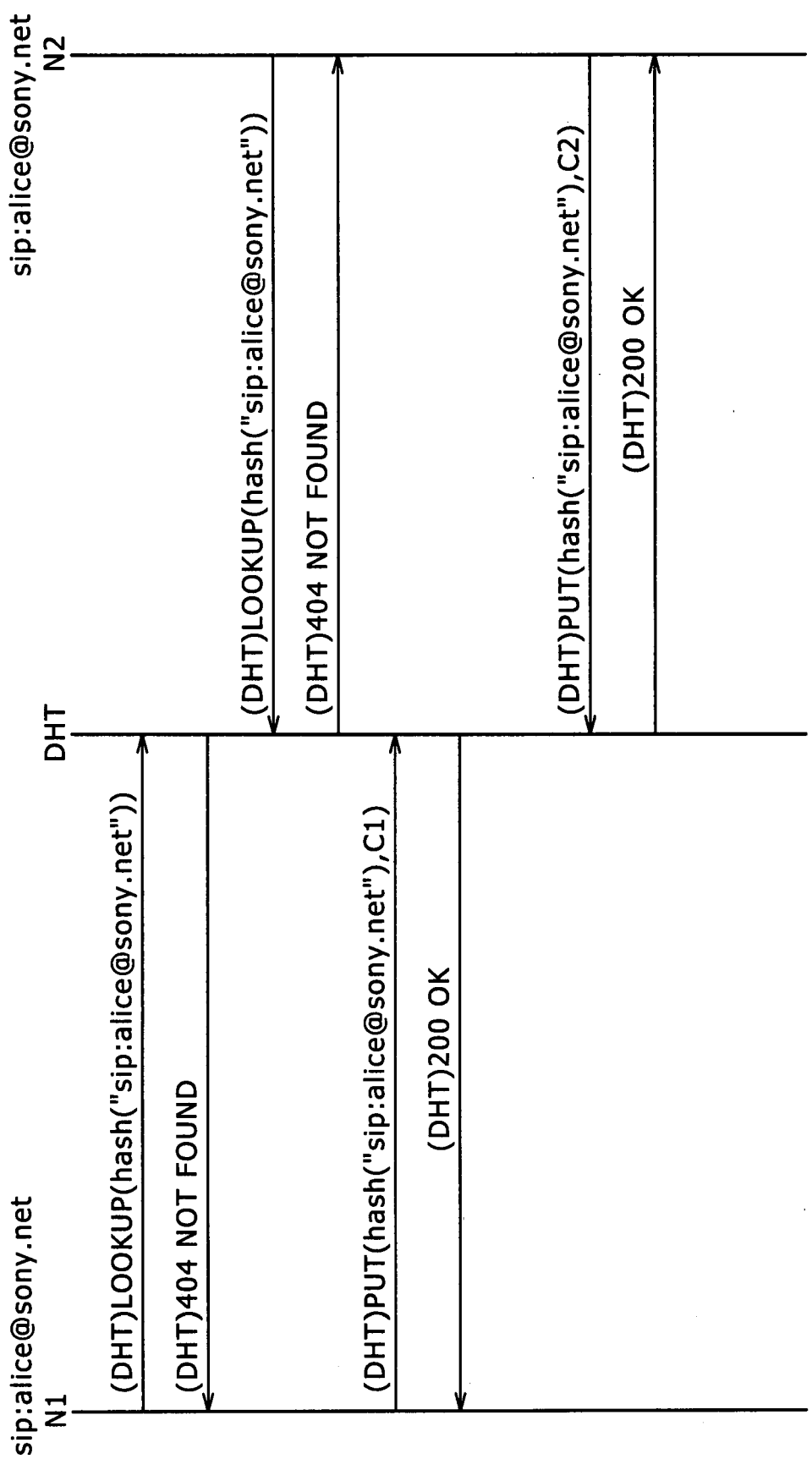
FIG. 5 illustrates a sequence for describing a problem that occurs when, in the communication environment in which only one piece of contact destination information can be registered at a time, an attempt is made to register a plurality of pieces of contact destination information.

In case (b) mentioned above, a problem may occur in the above sequence. FIG. 5 is a sequence diagram illustrating a case where a problem occurs.

(1) Upon login of sip:alice@sony.net, node N1 transmits the LOOKUP request to the distributed hash table DHT.

(2) The distributed hash table DHT looks up the value associated with the key hash("sip:alice@sony.net"). Since no such value is found, the distributed hash table DHT transmits the 404 NOT FOUND response to node N1.

(3) Upon login of sip:alice@sony.net, node N2 transmits the LOOKUP request to the distributed hash table DHT.

(4) The distributed hash table DHT looks up the value associated with the key hash("sip:alice@sony.net"). Since no such value is found, the distributed hash table DHT transmits the 404 NOT FOUND response to node N2.

(5) Because of the receipt of the 404 NOT FOUND response, node N1, in order to register contact destination information of node N1 itself for sip:alice@sony.net in the distributed hash table DHT, transmits a PUT request with contact information C1 to the distributed hash table DHT.

(6) The distributed hash table DHT registers the contact information C1, and transmits the 200 OK response to node N1.

(7) Because of the receipt of the 404 NOT FOUND response, node N2, in order to register contact destination information of node N2 itself for sip:alice@sony.net in the distributed hash table DHT, transmits a PUT request with contact information C2 to the distributed hash table DHT.

(8) The distributed hash table DHT overwrites the contact information C1 with the contact information C2, and transmits the 200 OK response to node N2.

As described above, the above sequence has a problem in that the contact information C1 previously registered is overwritten with the contact information C2.

In order to solve this problem, in the present embodiment, when making a change to data registered in the distributed hash table, a time when the data was updated is always checked. To this end, in the present embodiment, LOOKUP2 and UPDATE below are additionally prepared as new operations for the distributed hash table.

LOOKUP2(key,value): Look up the value associated with key in the distributed hash table. If any value associated with key is registered in the distributed hash table, the value registered is returned from the distributed hash table, whereas if no value associated with key is registered in the distributed hash table, value specified is registered in the distributed hash table.

UPDATE(key,value,time): Update the value associated with key to value. Note, however, that if a time at which the value registered in the distributed hash table was registered does not coincide with time, update is not performed, and an error is returned from the distributed hash table.

Figure 6:
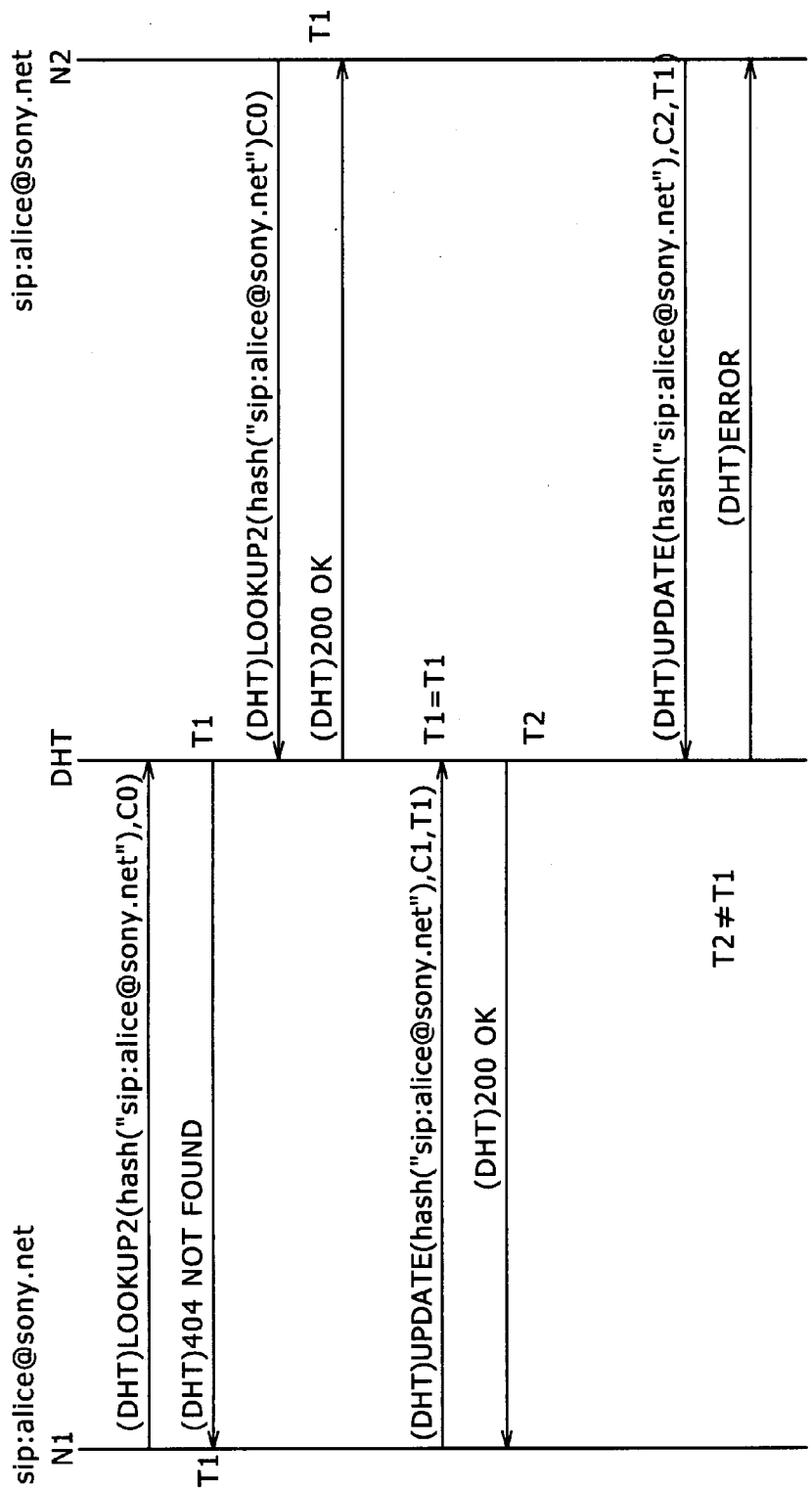
FIGS. 6 and 7 illustrate registration sequences according to a method in which, when a change is made to data registered in the distributed hash table, a time at which the data was updated is always checked.

With use of LOOKUP2, a provisional value is registered in the distributed hash table even when no value is registered in the distributed hash table, and based on a registration time of the registered value, time management of data update becomes possible. In addition, with use of UPDATE, it is possible to check whether the value when the node referred to the distributed hash table before update is different from the value that the node is attempting to update. FIG. 6 is a sequence diagram of a method in which an update time is checked.

(1) Upon login of sip:alice@sony.net, node N1 transmits a LOOKUP2 request with provisional contact information C0 to the distributed hash table DHT.

(2) The distributed hash table DHT looks up the value associated with the key hash("sip:alice@sony.net"). Since no such value is found, the distributed hash table DHT registers the provisional contact information C0 specified in LOOKUP2, and transmits a 404 NOT FOUND response with its registration time T1 to node N1.

(3) Upon login of sip:alice@sony.net, node N2 transmits the LOOKUP2 request with the provisional contact information C0 to the distributed hash table DHT.

(4) The distributed hash table DHT looks up the value associated with the key hash("sip:alice@sony.net"). Since the contact information C0 has been registered, the distributed hash table DHT transmits a 200 OK response with the contact information C0 and its registration time T1 to node N2.

(5) Because of the receipt of the 404 NOT FOUND response, node N1, in order to register the contact destination information of node N1 itself for sip:alice@sony.net in the distributed hash table DHT, transmits an UPDATE request with contact information C1 (composed of the provisional contact information C0 and the contact destination information of node N1 itself added thereto) and the registration time T1 to the distributed hash table DHT.

(6) The distributed hash table DHT compares the information T1 within the distributed hash table DHT with the information T1 in the UPDATE request. Since they coincide with each other, the distributed hash table DHT registers the contact information C1, and transmits the 200 OK response to node N1.

(7) Because of the receipt of the 200 OK response, node N2, in order to register the contact destination information of node N2 itself for sip:alice@sony.net in the distributed hash table DHT, transmits an UPDATE request with contact information C2 (composed of the provisional contact information C0 and the contact destination information of node N2 itself added thereto) and the registration time T1 to the distributed hash table DHT.

(8) The distributed hash table DHT compares information T2 within the distributed hash table DHT with the information T1 in the UPDATE request. Since the information T2 within the distributed hash table DHT is newer than the information T1 in the UPDATE request, the distributed hash table DHT transmits an error response to node N2 without registering the contact information C2.

Figure 7:
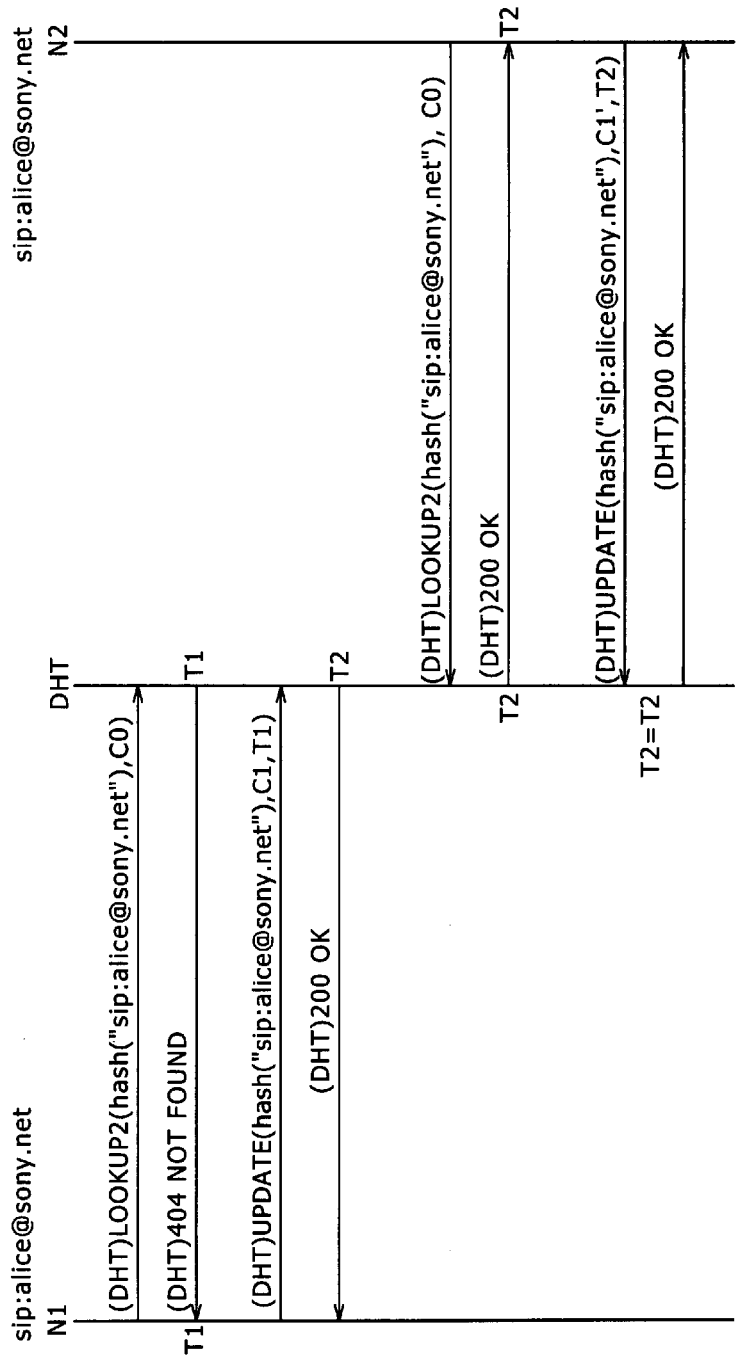

FIG. 7 is a sequence diagram illustrating a case where, in the method in which the update time is checked, a plurality of pieces of contact information are registered.

(1) Upon login of sip:alice@sony.net, node N1 transmits the LOOKUP2 request with the provisional contact information C0 to the distributed hash table DHT.

(2) The distributed hash table DHT looks up the value associated with the key hash("sip:alice@sony.net"). Since no such value is found, the distributed hash table DHT registers the provisional contact information C0 specified in LOOKUP2, and transmits the 404 NOT FOUND response with the registration time T1.

(3) Because of the receipt of the 404 NOT FOUND response, node N1, in order to register the contact destination information of node N1 itself for sip:alice@sony.net in the distributed hash table DHT, transmits the UPDATE request with the contact information C1 (composed of the provisional contact information C0 and the contact destination information of node N1 itself added thereto) and the registration time T1 to the distributed hash table DHT.

(4) The distributed hash table DHT compares the information T1 within the distributed hash table DHT with the information T1 in the UPDATE request. Since they coincide with each other, the distributed hash table DHT registers the contact information C1, and transmits the 200 OK response to node N1.

(5) Upon login of sip:alice@sony.net, node N2 transmits the LOOKUP2 request with the provisional contact information C0 to the distributed hash table DHT.

(6) The distributed hash table DHT looks up the value associated with the key hash("sip:alice@sony.net"). Since the contact information C1 has been registered, the distributed hash table DHT transmits a 200 OK response with the contact information C1 and its registration time T2 to node N2.

(7) Because of the receipt of the 200 OK response, node N2, in order to register the contact destination information of node N2 itself for sip:alice@sony.net in the distributed hash table DHT, transmits an UPDATE request with contact information C1' (composed of the contact information C1 registered by node N1 and the contact destination information of node N2 itself added thereto) and the registration time T2 to the distributed hash table DHT.

(8) The distributed hash table DHT compares the information T2 within the distributed hash table DHT with the information T2 in the UPDATE request. Since they coincide with each other, the distributed hash table DHT registers the contact information C1', and transmits the 200 OK response to node N2.

Figure 8:
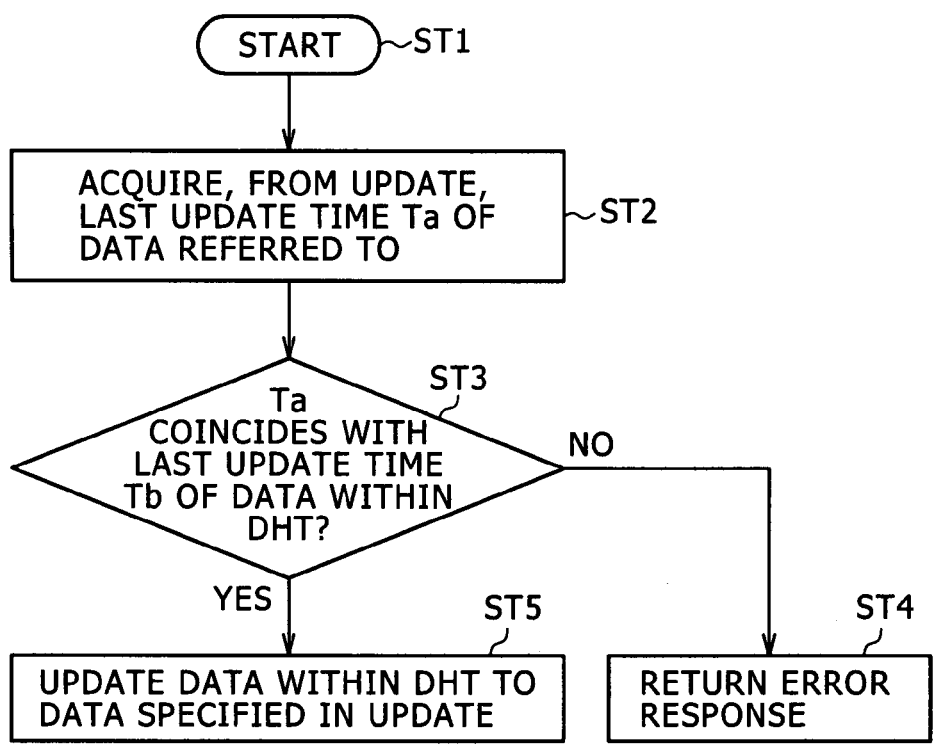
FIG. 8 is a flowchart illustrating a procedure performed in the distributed hash table.

A flowchart of FIG. 8 illustrates a procedure performed in the distributed hash table DHT when the UPDATE request has been received. After starting the procedure at step ST1, the distributed hash table DHT proceeds to step ST2. At step ST2, the distributed hash table DHT acquires, from the UPDATE request, a last update time Ta of data referred to.

Then, at step ST3, the distributed hash table DHT determines whether a last update time Tb of data within the distributed hash table DHT coincides with the time Ta acquired at step ST2. If the time Ta does not coincide with the time Tb, the distributed hash table DHT, at step ST4, returns the error response to a node that transmitted the UPDATE request. Meanwhile, if the time Ta coincides with the time Tb, the distributed hash table DHT, at step ST5, updates the data within the distributed hash table DHT to data specified in the UPDATE request.

An XML document below is an example of the provisional contact information C0 written in XML. The provisional contact information C0 specified in the LOOKUP2 request does not include the contact destination information. This is because, at the time of transmitting the LOOKUP2 request, not the contact destination information but notification of an intention of the node to update information is important.

```
<?xmlversion="1.0" encoding="utf-8"?>
<contactinfoentry="sip:alice@sony.net"
xmlns=http://xmlns.sony.net/dht/sip>
    <updated>2006-08-16T20:48:32+09:00</updated>
</contactinfo>
```

The contact information C1 transmitted from node N1 to the distributed hash table DHT in FIGS. 6 and 7 is composed of the contact information C0 and the contact destination information of node N1 itself added thereto. An XML document below is an example of the contact information C1 written in XML.

```
<?xmlversion="1.0" encoding="utf-8"?>
<contactinfoentry="sip:alice@sony.net"
xmlns=http://xmlns.sony.net/dht/sip>
    <updated>2006-08-16T20:51:16+09:00</updated>
    <entry>
    <contact>sip:alice@192.168.0.1:5060</contact>
    <updated>2006-08-16T20:51:16+09:00</updated>
    <expires>3600</expires>
    <methods>
    <allow>INVITE</allow>
    <allow>CANCEL</allow>
    <allow>BYE</allow>
    <allow>ACK</allow>
    <allow>OPTIONS</allow>
    <allow>PRACK</allow>
    <allow>UPDATE</allow>
    </methods>
    <extensions>
    <supported>100rel</supported>
    </extensions>
    </entry>
</contactinfo>
```

As described above, the contact information C1' transmitted from node N2 to the distributed hash table DHT in FIG. 7 is composed of the contact information C1 and the contact destination information of node N2 itself added thereto. An XML document below is an example of the contact information C1' written in XML.

```
<?xmlversion="1.0" encoding="utf-8"?>
<contactinfoentry="sip:alice@sony.net"
xmlns=http://xmlns.sony.net/dht/sip>
    <updated>2006-08-16T21:34:26+09:00</updated>
    <entry>
    <contact>sip:alice@192.168.0.1:5060</contact>
    <updated>2006-08-16T20:51:16+09:00</updated>
    <expires>3600</expires>
    <methods>
    <allow>INVITE</allow>
    <allow>CANCEL</allow>
    <allow>BYE</allow>
    <allow>ACK</allow>
    <allow>OPTIONS</allow>
    <allow>PRACK</allow>
    <allow>UPDATE</allow>
    </methods>
    <extensions>
    <supported>100rel</supported>
    </extensions>
    </entry>
    <entry>
    <contact>sip:alice@192.168.0.7:5060</contact>
    <updated>2006-08-16T21:34:26+09:00</updated>
    <expires>3600</expires>
    <methods>
    <allow>INVITE</allow>
    <allow>CANCEL</allow>
    <allow>BYE</allow>
    <allow>ACK</allow>
    <allow>OPTIONS</allow>
    <allow>PRACK</allow>
    <allow>UPDATE</allow>
    </methods>
    <extensions>
    <supported>100rel</supported>
    </extensions>
    </entry>
</contactinfo>
```

As described above, the introduction of the LOOKUP2 request and the UPDATE request makes it possible to register a plurality of pieces of contact destination information for a single SIP URI.

The above-described method is used to achieve SIP signaling. First, when sip:alice@sony.net has logged in to the terminal, the contact information is registered in the distributed hash table. When registering the contact information in the distributed hash table, care needs to be taken in assigning the name. For example, the following SIP URIs mean the same, but if they are used as the name for calculating the key in the distributed hash table, different keys result.

sip:alice@sony.net
sip:alice@sony.net:5060
sip:alice@192.168.0.1
sip:alice@192.168.0.1:5060

If pieces of information for the same user are registered in the distributed hash table using different keys, the storage of the distributed hash table may run out of capacity easily; therefore, it is desirable that, if possible, they be treated as a single piece of contact information. Therefore, in the present method, only sip:alice@sony.net is registered in the distributed hash table, while the others are not registered in the distributed hash table. In the case where "sip:alice@sony.net" is followed by a port number, first, <contactinfo> is acquired with sip:alice@sony.net, an address with the port number omitted is extracted from <contact>, and the extracted address with a specified port number added thereto is sent. In the case where an IP address follows "@", the name resolution is not performed using the distributed hash table. In the case where a hostname is written without "@", the name resolution is performed using DNS, while the name resolution by use of the distributed hash table is not performed.

Figure 9:
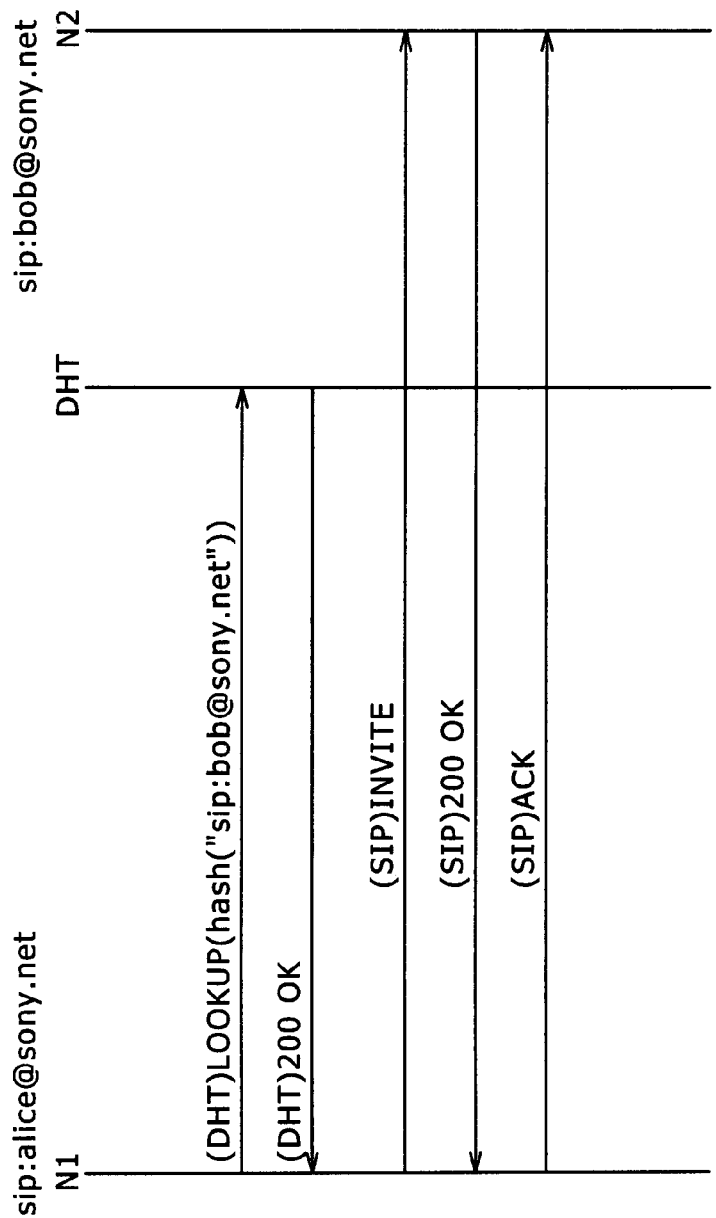
FIG. 9 illustrates an exemplary sequence of basic signaling in the network system that employs the distributed hash table.
Figure 10:
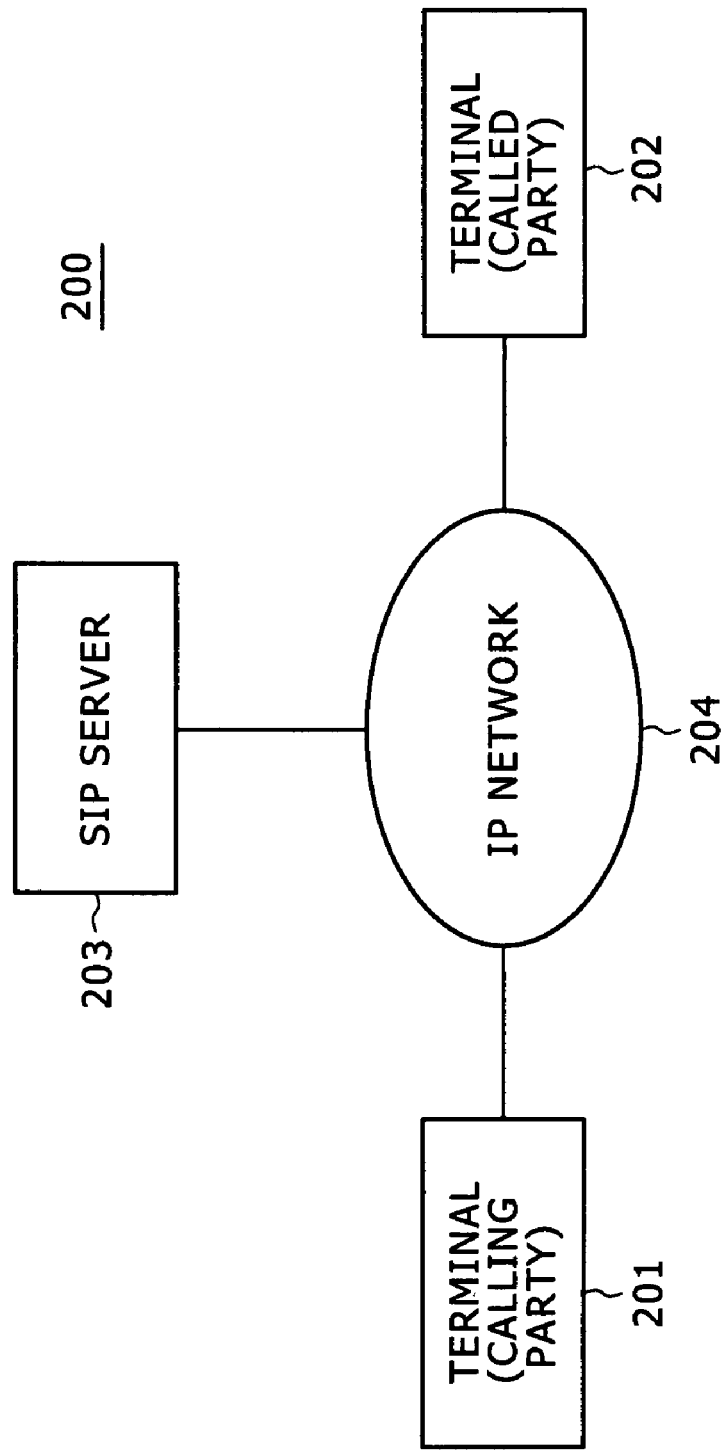
FIG. 10 is a block diagram illustrating a basic configuration of a communication system that employs SIP.
Figure 11:
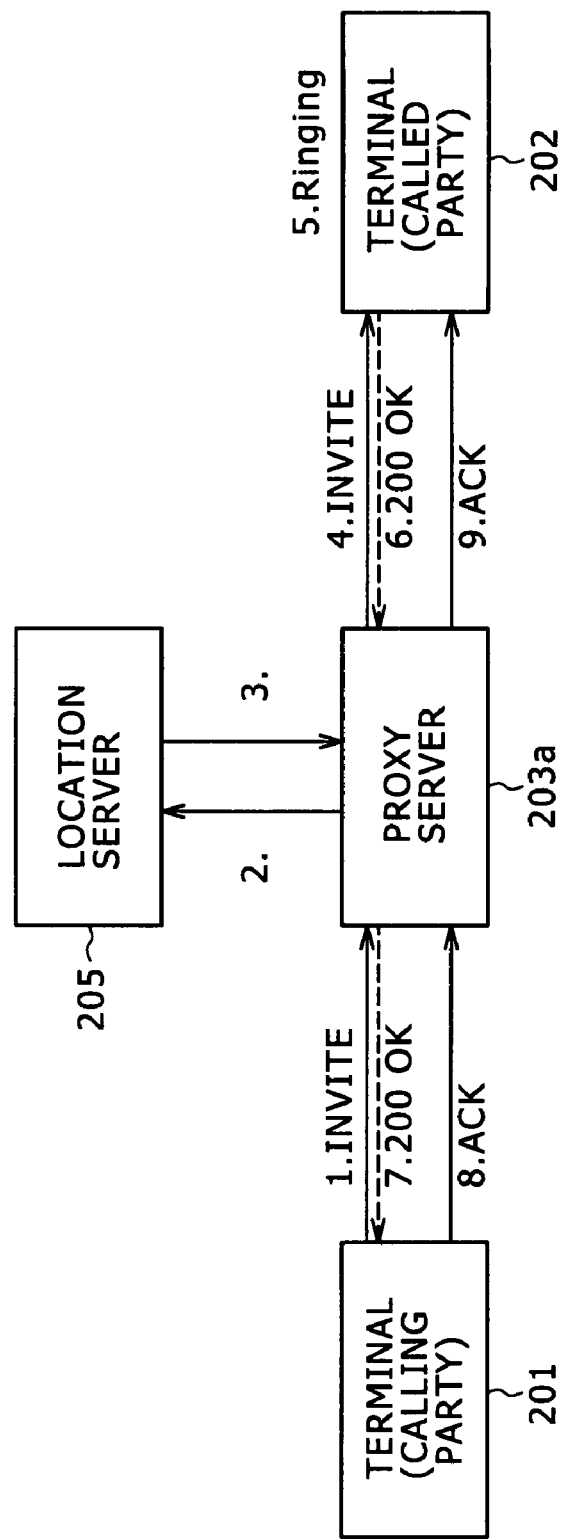
FIG. 11 illustrates an example of signaling employing SIP.
Figure 12:
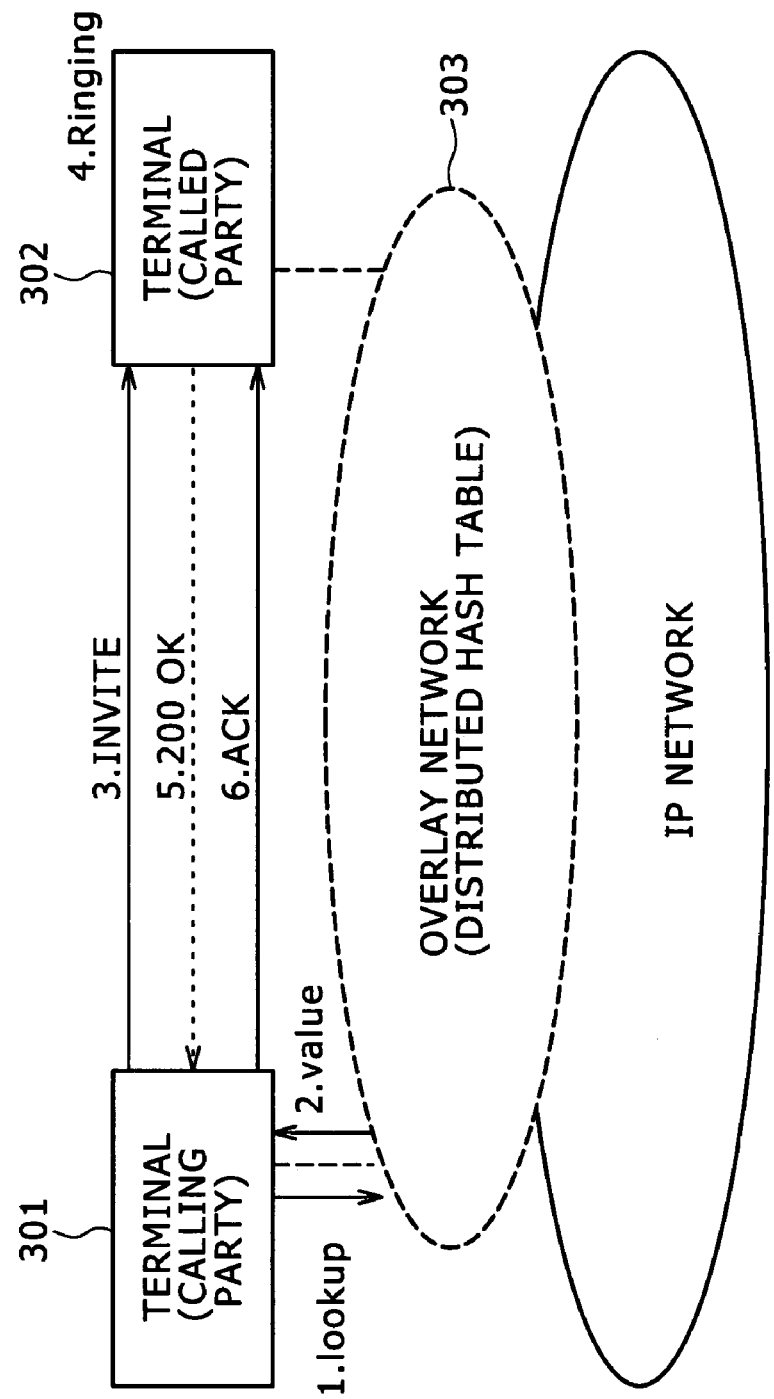
FIG. 12 illustrates an example of signaling employing the distributed hash table.

FIG. 9 is an exemplary sequence of basic signaling in which sip:alice@sony.net originates a call to sip:bob@sony.net. It is assumed here that contact destination information of each SIP URI has been registered in the distributed hash table in the above-described manner.

(1) In order to acquire the contact destination information of sip:bob@sony.net, node N1 transmits the LOOKUP request to the distributed hash table DHT.

(2) The distributed hash table DHT uses the 200 OK response to return the contact destination information corresponding to sip:bob@sony.net to node N1.

(3) Node N1 acquires a contact destination from the contact destination information of sip:bob@sony.net, and transmits an INVITE request directly to node N2, which is the contact destination.

(4) Upon receipt of the INVITE request, node N2 transmits the 200 OK response to node N1.

(5) Node N1 transmits the ACK response to node N2. As a result, a session is created between node N1 and node N2, and exchange of audio data, image data, or the like is started on the created session.

When sip:alice@sony.net logs out of the node, or when the node itself leaves the overlay network, it is necessary to delete the contact information from the distributed hash table before leaving. In the case where the contact information can be deleted completely without any problem, DELETE(key) may be used to delete the contact information. However, since a plurality of contact destinations may be registered, it is desirable that only an unnecessary portion of the contact information within the XML document be deleted in accordance with a sequence similar to that of registration, and that only when no other contact destination is registered, DELETE(key) is used for deletion.

The present invention makes it possible to register a plurality of pieces of contact destination information for a single node address, and is applicable to a network system that employs the distributed hash table.

It should be understood by those skilled in the art that various modifications, combinations, sub-combinations and alterations may occur depending on design requirements and other factors insofar as they are within the scope of the appended claims or the equivalents thereof.

What is claimed is:

1. A contact destination information registration method employed in a network system that includes a plurality of nodes and employs a distributed hash table, wherein
when registering contact destination information corresponding to a predetermined node address in the distributed hash table, the node
first performs a first request operation of looking up a value associated with a key that is a hash value of the node address in the distributed hash table, and, if no value associated with the key is registered in the distributed hash table, registering provisional contact destination information in the distributed hash table so as to be associated with the key and acquiring a first registration time of the provisional contact destination information, but, if any value associated with the key is registered in the distributed hash table, acquiring a second registration time of the value registered, and then
performs a second request operation of registering true contact destination information in the distributed hash table so as to be associated with the key, the second request operation including transmitting the true contact destination information and the first or second registration time acquired by the first request operation, wherein the second request is granted if the first or second registration time of the value registered in the distributed hash table so as to be associated with the key after a last update of the distributed hash table coincides with the first or second registration time acquired by the first request operation.

2. A network system that comprises a plurality of nodes and employs a distributed hash table, each of said nodes including a distributed hash table section configured to access the distributed hash table, wherein
when registering contact destination information corresponding to a predetermined node address in the distributed hash table, the distributed hash table section
first performs a first request operation of looking up a value associated with a key that is a hash value of the predetermined node address in the distributed hash table, and, if no value associated with the key is registered in the distributed hash table, registering provisional contact destination information in the distributed hash table so as to be associated with the key and acquiring a first registration time of the provisional contact destination information, but, if any value associated with the key is registered in the distributed hash table, acquiring a second registration time of the value registered, and then
performs a second request operation of registering true contact destination information in the distributed hash table so as to be associated with the key, the second request operation including transmitting the true contact destination information and the first or second registration time acquired by the first request operation, wherein the second request is granted if the first or second registration time of the value registered in the distributed hash table so as to be associated with the key after a last update of the distributed hash table coincides with the first or second registration time acquired by the first request operation.

3. A node that forms a part of a network system that employs a distributed hash table, said node comprising
a distributed hash table section configured to access the distributed hash table, wherein
when registering contact destination information corresponding to a predetermined node address in the distributed hash table, said distributed hash table section
first performs a first request operation of looking up a value associated with a key that is a hash value of the predetermined node address in the distributed hash table, and, if no value associated with the key is registered in the distributed hash table, registering provisional contact destination information in the distributed hash table so as to be associated with the key and acquiring a first registration time of the provisional contact destination information, but, if any value associated with the key is registered in the distributed hash table, acquiring a second registration time of the value registered, and then
performs a second request operation of registering true contact destination information in the distributed hash table so as to be associated with the key, the second request operation including transmitting the true contact destination information and the first or second registration time acquired by the first request operation, wherein the second request is granted if the first or second registration time of the value registered in the distributed hash table so as to be associated with the key after a last update of the distributed hash table coincides with the first or second registration time acquired by the first request operation.

4. A contact destination information registration program that causes a node that forms a part of a network system that employs a distributed hash table to perform the following steps when registering contact destination information corresponding to a predetermined node address in the distributed hash table:

a) looking up a value associated with a key that is a hash value of the predetermined node address in the distributed hash table, and, if no value associated with the key is registered in the distributed hash table, registering provisional contact destination information in the distributed hash table so as to be associated with the key and acquiring a first registration time of the provisional contact destination information, but, if any value associated with the key is registered in the distributed hash table, acquiring a second registration time of the value registered; and b) after said step a:, registering true contact destination information in the distributed hash table so as to be associated with the key, the second request operation including transmitting the true contact destination information and the first or second registration time acquired by the first request operation, wherein the second request is granted if the first or second registration time of the value registered in the distributed hash table so as to be associated with the key after a last update of the distributed hash table coincides with the first or second registration time acquired in said step a).

* * * * *